United States Patent
Raheja et al.

(10) Patent No.: US 12,260,225 B2
(45) Date of Patent: *Mar. 25, 2025

(54) SYSTEM AND METHOD FOR PROVIDING SYSTEM LEVEL SLEEP STATE POWER SAVINGS

(71) Applicant: ADVANCED MICRO DEVICES, INC., Santa Clara, CA (US)

(72) Inventors: Jyoti Raheja, Boxborough, MA (US); Hideki Kanayama, Santa Clara, CA (US); Guhan Krishnan, Boxborough, MA (US); Ruihua Peng, Santa Clara, CA (US)

(73) Assignee: ADVANCED MICRO DEVICES, INC., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/943,265

(22) Filed: Sep. 13, 2022

(65) Prior Publication Data

US 2023/0004400 A1 Jan. 5, 2023

Related U.S. Application Data

(63) Continuation of application No. 16/718,656, filed on Dec. 18, 2019, now Pat. No. 11,449,346.

(51) Int. Cl.
*G06F 1/3234* (2019.01)
*G06F 1/3287* (2019.01)
*G06F 9/4401* (2018.01)
*G06F 12/0804* (2016.01)

(52) U.S. Cl.
CPC .......... *G06F 9/4418* (2013.01); *G06F 1/3268* (2013.01); *G06F 1/3287* (2013.01); *G06F 12/0804* (2013.01); *G06F 2212/1032* (2013.01)

(58) Field of Classification Search
CPC .... G06F 9/4418; G06F 1/3268; G06F 1/3287; G06F 12/0804; G06F 2212/1032
USPC ........................................... 711/143
See application file for complete search history.

(56) References Cited

U.S. PATENT DOCUMENTS

| | | | |
|---|---|---|---|
| 7,218,566 B1 | 5/2007 | Totolos et al. | |
| 8,074,086 B1 | 12/2011 | Sancheti et al. | |
| 9,104,413 B2 | 8/2015 | Lo et al. | |
| 9,472,261 B1 | 10/2016 | Chun et al. | |
| 9,891,687 B2* | 2/2018 | Park | G06F 1/3287 |
| 2008/0005516 A1 | 1/2008 | Meinschein et al. | |
| 2009/0063761 A1 | 3/2009 | Gower et al. | |

(Continued)

*Primary Examiner* — Christopher B Shin (57) ABSTRACT

A system for providing system level sleep state power savings includes a plurality of memory channels and corresponding plurality of memories coupled to respective memory channels. The system includes one or more processors operative to receive information indicating that a system level sleep state is to be entered and in response to receiving the system level sleep indication, moves data stored in at least a first of the plurality of memories to at least a second of the plurality of memories. In some implementations, in response to moving the data to the second memory, the processor causes power management logic to shut off power to: at least the first memory, to a corresponding first physical layer device operatively coupled to the first memory and to a first memory controller operatively coupled to the first memory and place the second memory in a self-refresh mode of operation.

20 Claims, 5 Drawing Sheets

(56) References Cited

U.S. PATENT DOCUMENTS

| | | |
|---|---|---|
| 2013/0094271 A1 | 4/2013 | Schuetz |
| 2016/0054947 A1 | 2/2016 | Liu et al. |
| 2017/0329389 A1* | 11/2017 | Kim .................... G06F 12/0223 |
| 2018/0293011 A1 | 10/2018 | Schluessler et al. |
| 2019/0042157 A1* | 2/2019 | Bonen ................. G06F 13/1668 |
| 2019/0196733 A1* | 6/2019 | Lee ....................... G06F 3/0659 |
| 2019/0206840 A1* | 7/2019 | Lee ..................... G11C 11/4093 |
| 2019/0259457 A1 | 8/2019 | Jun |
| 2019/0304530 A1* | 10/2019 | Choi .......................... G06F 1/32 |
| 2020/0143275 A1* | 5/2020 | Shirota ................. G06N 20/00 |
| 2020/0201418 A1* | 6/2020 | Richter ............... G11C 11/4076 |
| 2020/0409447 A1* | 12/2020 | Tomimatsu ........... G06F 3/1221 |

\* cited by examiner

SYSTEM AND METHOD FOR PROVIDING SYSTEM LEVEL SLEEP STATE POWER SAVINGS

BACKGROUND OF THE DISCLOSURE

Portable devices such as laptops, smart devices, wearables and other portable devices require improved power saving to increase battery life. Other devices such as game consoles, servers and computer systems also may require power savings to save energy costs and reduce heat generation. Many devices have systems that support multiple power states that correspond to power states defined, for example, in the Advanced Configuration and Power Interface (ACPI) specification or other adopted specifications. System level power states describe the power consumption of the system as a whole. Operating systems typically support multiple system power states that may have different levels of power consumption, different software resumption techniques, hardware latency considerations and system hardware data management. Data can include context information in volatile processor registers, memory caches, random-access memory and must be managed so that the operating system can reboot or return to the working state in an appropriate manner.

When a device is in a system level sleep state, such as an "S3" power state as defined by the ACPI Standard, processors are off and after a wakeup event, control starts from the processor's reset vector. For example, with some devices, a "sleep" button may be activated from an operating system menu which puts the systems in the S3 power savings state. The system sleep state saves system level state information to memory and powers off most of the system components except the physical layer memory channel interface (e.g., physical layer interface) power rails and the dynamic random-access memory (DRAM) (e.g., DIMMS) attached to the physical interfaces. The physical layer memory channel interfaces are kept in a low power state (power is still provided to the circuits, but they operate in a low power state) and memory is kept in a self-refresh mode to keep channels on, but in a low power state until the user or any system event, like a power button press or USB device connection, requests a system to come back to an active or working state. As such, even during a system sleep state, the channels, through the physical memory channel interfaces and the memories themselves, consume some power which can add up over the course of a duration of the system inactiveness. Memory controllers that are connected to the physical layer memory channel interfaces are also typically shut off since their voltage rail is typically shut off but the physical layer memory channel interfaces and memories themselves are still drawing power. This can add up to significant amounts of power consumption for computers, game consoles and other devices and may lead to eventual system shutdown for battery operated devices. In addition, as devices become more and more complex, an increasing number of memory channels are being used with high bandwidth memory (HBM) which are high performance random-access memory interfaces for 3D-stacked SDRAM so during S3 sleep state, more and more power is consumed as the added high bandwidth memories are in self-refresh mode and the physical layer memory channel interfaces are also still consuming power in a low power mode.

Therefore, a need exists for methods and systems to provide improved power savings during a system level sleep state mode.

BRIEF DESCRIPTION OF THE DRAWINGS

The implementations will be more readily understood in view of the following description when accompanied by the below figures, wherein like reference numerals represent like elements, and wherein.

DETAILED DESCRIPTION OF IMPLEMENTATIONS

In some implementations, during a system level sleep state mode, data such as system state information is moved from current memories to a fewer number of memories to reduce the number of memories and physical layer memory channel interfaces that are in low power mode and in self-refresh mode. In these implementations, the power is turned off for all the physical layer memory channel interfaces and corresponding memories that have their state information moved to other memories. Power savings is improved by shutting power off to memory channels in a system level sleep mode.

In certain implementations, a method for providing system level sleep state power savings in a system that employs a plurality of memory channels and corresponding plurality of memories coupled to respective memory channels, includes receiving information indicating a system level sleep state is to be entered and in response to receiving the information indicating the system level sleep state is to be entered, moving data stored in at least a first memory to at least a second memory of the plurality of memories. The method includes, in response to moving the data to the second memory, shutting off power at least: to the first memory, to a corresponding first physical layer interface forming a first channel associated with the first memory and to a first memory controller operatively coupled to the first memory, and placing the second memory corresponding to a second channel in a self-refresh mode of operation.

In some examples, the method further includes receiving an indication to enter a system level working state and a powering on the first memory, the corresponding first physical layer device and the first memory controller. In certain examples, the method includes and changing the second memory from a self-refresh mode to a normal operating mode. In certain examples, each of the plurality of memories are dynamic random-access memories and the data includes context data for one or more processes of the one or more processors of the system.

In some examples, moving data stored in at least the first of the plurality of memories to at least a second of the plurality of memories includes determining a plurality of dirty pages in the first memory associated with the first channel, moving the determined dirty pages to available physical pages of memory in the second memory associated with the second channel, and remapping page table entries associated with the moved dirty pages for one or more processes that were using the dirty pages prior to movement of the page tables.

In certain examples, moving data stored in at least the first memory to at least the second memory of the plurality of memories includes causing a data transport network, under control of a controller, to copy data from the first memory to the second memory. In some examples, the method includes shutting off power at least to the first memory, to the first physical layer device and to the first memory controller includes configuring the first memory controller to cause power to be shut off to the first memory and to the first physical layer device. In some examples, the method includes using the moved data stored in the second of the plurality of memories to restart processes of a processor when waking up out of the system level sleep state.

In certain implementations, a system for providing system level sleep state power savings includes a plurality of memory channels and corresponding plurality of memories coupled to respective memory channels. The system includes one or more processors that receive information indicating that a system level sleep state is to be entered and in response to receiving the system level sleep indication, moves data stored in at least a first memory to at least a second memory of the plurality of memories. In some implementations, in response to moving the data to the second memory, the processor causes power management logic to shut off power to: at least the first memory, to a corresponding first physical layer device, and to a first memory controller and place the second memory in a self-refresh mode of operation.

In certain implementations, one or more processors receives an indication to enter a system level working state and in response to the system level working state indication, causes the power management logic to power on the first memory, the corresponding first physical layer device and the first memory controller, and change the second memory from a self-refresh mode to a normal operating mode. In some examples, each of the plurality of memories are dynamic random-access memories.

In certain examples, one or more processors move data stored in the first memory to the second memory of the plurality of memories by at least determining a plurality of dirty pages in the first memory associated with the first channel. The processor moves the determined dirty pages to available physical pages of memory in the second memory associated with the second channel and remaps page table entries associated with the moved dirty pages for one or more processes that were using the dirty pages prior to movement of the page tables. In some examples, the processor uses the moved data stored in the second memory of the plurality of memories to restart processes when waking up out of the system level sleep state.

In certain examples, the system includes a data transport network that moves the data stored in the first memory to the second memory of the plurality of memories by copying data from the first memory to the second memory. In some examples, memory controller configuration logic configures the memory controller to shut off power at least to the first memory and to the first physical layer device.

In some examples, the one or more processors includes at least one central processing core and another of the processors includes at least one graphics processing core. In certain examples, the first and second memories are used as main memory of the system. In some examples, the system further includes a display that displays data from the first and second memories during normal operation. In certain examples, the system is comprised of a system on chip (SoC). In some examples, the processor executes a stored operating system from system memory that provides the information indicating a system level sleep state is to be entered.

In certain implementations, a non-transitory storage medium stores executable instructions that when executed by one or more processors causes the one or more processors to receive information indicating a system level sleep state is to be entered and in response to receiving the system level sleep indication, move data stored in at least a first memory to at least a second memory of the plurality of memories. The storage medium stores instructions that when executed by the one or more processors, causes the one or more processors to cause power management logic to shut off power at least: to the first memory, to a corresponding first physical layer device operatively coupled to the first memory and to a first memory controller operatively coupled to the first memory, and place the second memory in a self-refresh mode of operation.

In some implementations, the non-transitory storage medium includes stored executable instructions that when executed by one or more processors causes the one or more processors to receive an indication to enter a system level working state, in response to the system level working state indication, cause the power management logic to power on the first memory, the corresponding first physical layer device and the first memory controller, and change the second memory from a self-refresh mode to a normal operating mode.

In certain examples, the non-transitory storage medium includes stored executable instructions that when executed by one or more processors causes the one or more processors to move data stored in at least the first memory to at least the second memory of the plurality of memories by at least determining a plurality of dirty pages in the first memory associated with the first channel, moving the determined dirty pages to available physical pages of memory in the second memory associated with the second channel, and remapping page table entries associated with the moved dirty pages for one or more processes that were using the dirty pages prior to movement of the page tables.

In some examples, the non-transitory storage medium includes stored executable instructions that when executed by one or more processors causes the one or more processors to use the moved data stored in the second memory of the plurality of memories to restart processes when waking up out of the system level sleep state.

In certain examples, the non-transitory storage medium includes stored executable instructions that when executed by one or more processors causes the one or more processors to cause a data transport network to copy data from the first memory to the second memory and configuring a first memory controller to cause power to be shut off to the first memory and to the first physical layer interface.

In some implementations, only selected physical layer memory channel interfaces are allowed to operate in a low power state and corresponding memories are in self-refresh mode while power rails to other physical layer memory channel interfaces are shut off and corresponding memories are completely shut off. Among other technical benefits, power savings is improved by completely shutting off power to some memory channels while leaving certain other memory channels in low power mode resulting in longer device battery life and/or reduced heat generation.

Figure 1:
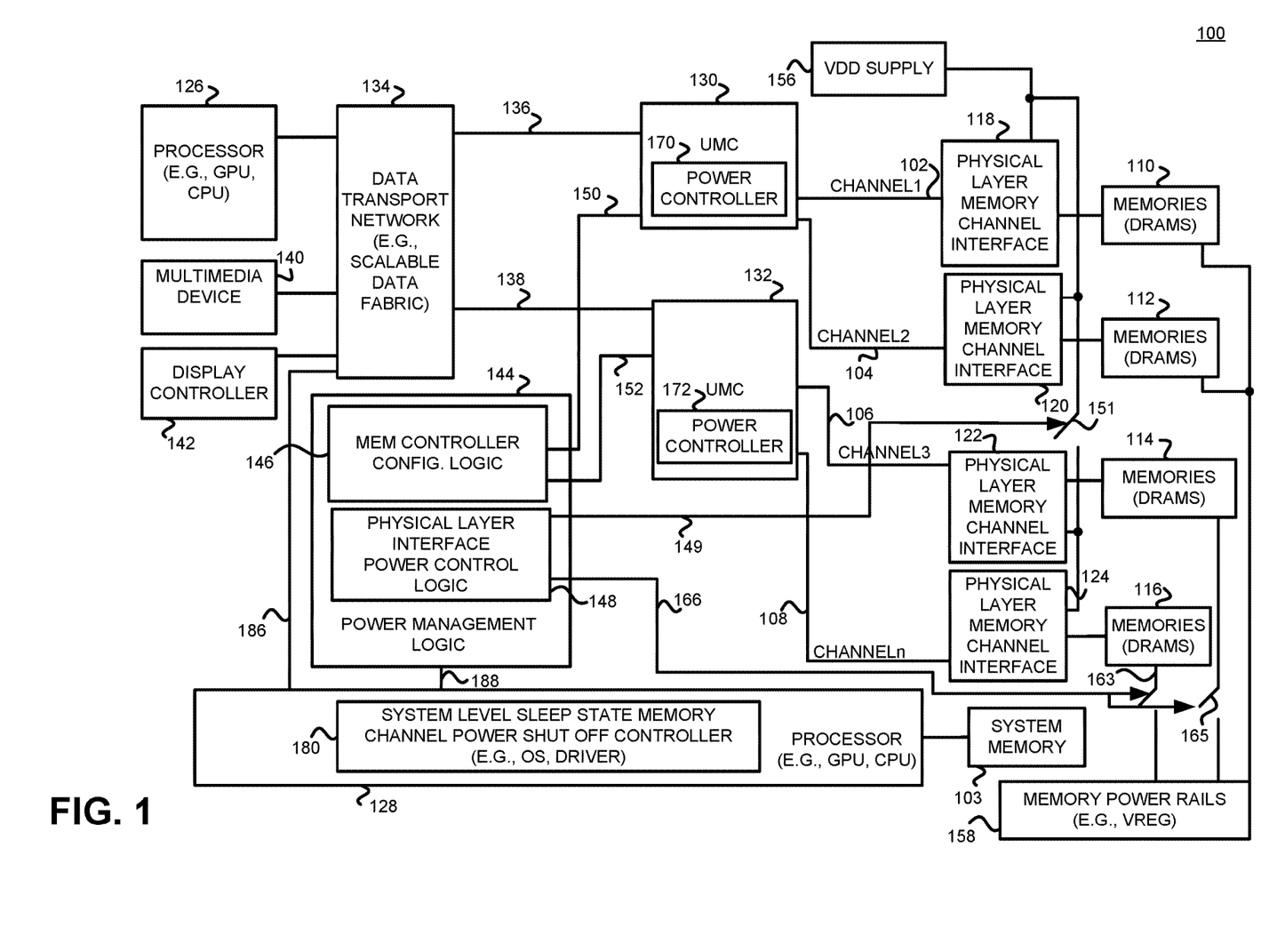
FIG. 1 is a block diagram illustrating a device that employs system level sleep state power savings in accordance with one example set forth in the disclosure.

FIG. 1 illustrates one example of a system 100 that includes a plurality of memory channels 102, 104, 106, 108 and corresponding plurality of memories 110, 112, 114, 116 that are coupled to the respective memory channels. In this example, each of the memories includes DRAM. Each of the memories 110-116 is coupled to a respective physical layer interface such as a physical layer memory channel interface 118, 120, 122, 124 respectively. The system 100, in this example, includes a plurality of processors 126 and 128 such as one or more central processing unit (CPU) cores, graphics processing unit (GPU) cores or any other suitable digital processing logic. The system 100 includes memory controllers (UMCs) 130 and 132 that are, in this example, unified memory controllers that allow both CPU cores and GPU cores to store and retrieve data from the memories. In this example, memory controller 130 uses channel 1 and channel 2 to access memories 110 and 112 respectively, whereas memory controller 132 controls data access for memories 114 and 116 using channel 3 and channel 4 such that in some implementations one channel is used to control one DRAM. It will be recognized that any suitable number of channels may be provided by respective memory controllers and that any suitable number of memories may also be employed as needed.

A data transport network 134, such as a scalable data fabric, provides data 136 and 138 (e.g., using a data transport communication protocol) to or from data providing and data consuming devices such as the processors 126, 128 as well as any other suitable devices. In this example, a multimedia device 140 and display controller 142 are also shown and generate or consume data that is stored to or retrieved from the memories 110-116 through the respective memory controllers 130 and 132.

In this example, the system 100 also includes power management logic (PML) 144, also referred to as a power management unit (PMU), that includes memory controller configuration logic 146 and physical layer interface power control logic 148. The memory controller configuration logic 146 provides memory controller configuration data 150 and 152 (e.g., using a system management network protocol) and any other suitable information to control the memory controllers 130 and 132. The physical layer interface power control logic 148 provides power control information 149 to control power to physical layer memory channel interfaces, in this example using switch 151. In some implementations, the power management logic is accessed through a scalable control fabric that transports control/configuration information, but no such fabric is needed.

In this example, the switch 151 is controlled to provide power to respective physical layer memory channel interfaces 122 and 124. For example, power supply 156 (e.g., a VDD rail) supplies power to physical layer memory channel interfaces 118 and 120 and to physical layer memory channel interfaces 122 and 124 through switch 151. In certain implementations, different power rails are used for each physical layer memory channel interface or groups of interfaces as needed so that desired interfaces can be turned off while others are kept on when attached memory is in self refresh mode. In some implementations, each of the memory controllers 130 and 132 include power controllers 170 and 172 that send power up and power down commands to the memories 110-116. In one example, the power down commands to the memories cause particular DRAMs (e.g., DDR5 or DDR4 compliant DDRAMs) to go into a self-refresh mode for those channels that are left in a low power state as further described below. In some implementations, two separate voltage supply domains are used to supply power to the memories 110-116, through multiple voltage regulators (e.g., off-chip regulators) shown as memory power rails 158. One domain or rail for the memories 114 and 116 is turned off through one or more switches 163 and 165 and one that is kept on for memories 110 and 112. For example, a power rail for memories 110 and 112 is always on but the memories 110 and 112 are controlled to enter a self-refresh state during the system sleep state whereas the power rail to memories 114 and 116 is switchable to be on or off and switched to an off state by the power management logic 144 via power control information 166 from the physical layer interface power control logic 148 during the system sleep state. In certain implementations, the physical layer interface power control logic 148 sends the power control information 166 through a southbridge circuit to the switches 163 and 165, however any suitable mechanism may be employed to shut off power to the memories 114 and 116 during the sleep state.

In this example, the processor 128 (e.g., part of a hybrid processor, multicore processor or any other suitable processor) executes an operating system and power state control driver. In one example, the processor executes a driver that when executed, serves as a system level sleep state memory channel power shutoff controller 180.

In one example, the system 100 includes memory 103 which in this example, is shown as system memory, however any suitable memory may be employed. The memory 103 in some implementations stores executable instructions that when executed by the one or more processors 128 and 126, cause the one or more processors to carry out the operations as described herein. The memory 103 may be any suitable memory including ROM, RAM, persistent memory, distributed memory that is available across multiple devices, servers, may be cloud based memory accessible by the one or more processors or any other suitable storage medium.

The data transport network 134 in one example, is a scalable data fabric as known in the art which serves as a data communication plane such that data from and to the processor cores and to other peripherals such as the memory controllers and input/output devices such as USB, PCI Express or other peripherals, are routed. The data transport network can extend over multiple dies as well as multiple sockets over PCI Express links.

The power management logic 144 in one example, connects to other components, such as scalable communication fabrics, as needed. In other examples, the power management logic can be implemented as any suitable hardware, circuitry or processing logic that executes instructions that when executed, cause the memory controller configuration logic and physical layer interface power control logic to carry out the operations as described herein. The data transport network 134 also may be any suitable structure that routes data or may not be needed depending on the architecture.

The system level sleep state memory channel power shutoff controller 180 in one example, is implemented as one or more processing cores executing code, such as a driver, stored in memory 103 that when executed, causes the one or more processing cores to operate as described herein. Alternatively, the system level sleep state memory channel power shutoff controller 180 may be implemented as part of application specific integrated circuit, dedicated hardware, or any other suitable structure as desired.

The memories are shown as being dynamic random-access memories but may be any suitable memories and the data that is moved in this example, is context data for one or more processes that are operational on the one or more processors 128 and 126 and needed for proper wakeup of the system from a sleep state. Other data may also be moved. For example, one or more applications, applets, firmware or any other processes operating on the processors store context data in the memories and the context data and any other required data for wakeup is moved corresponding to certain channels so that only certain channels are left on while other channels are completely shut off. The context data is saved for use in coming out of the sleep state so that the system may boot up in a proper fashion. As such, the system 100 uses the moved data that is stored in memory 110 and/or memory 112 to restart processes of a processor when waking up out of the system level sleep state.

Figure 2:
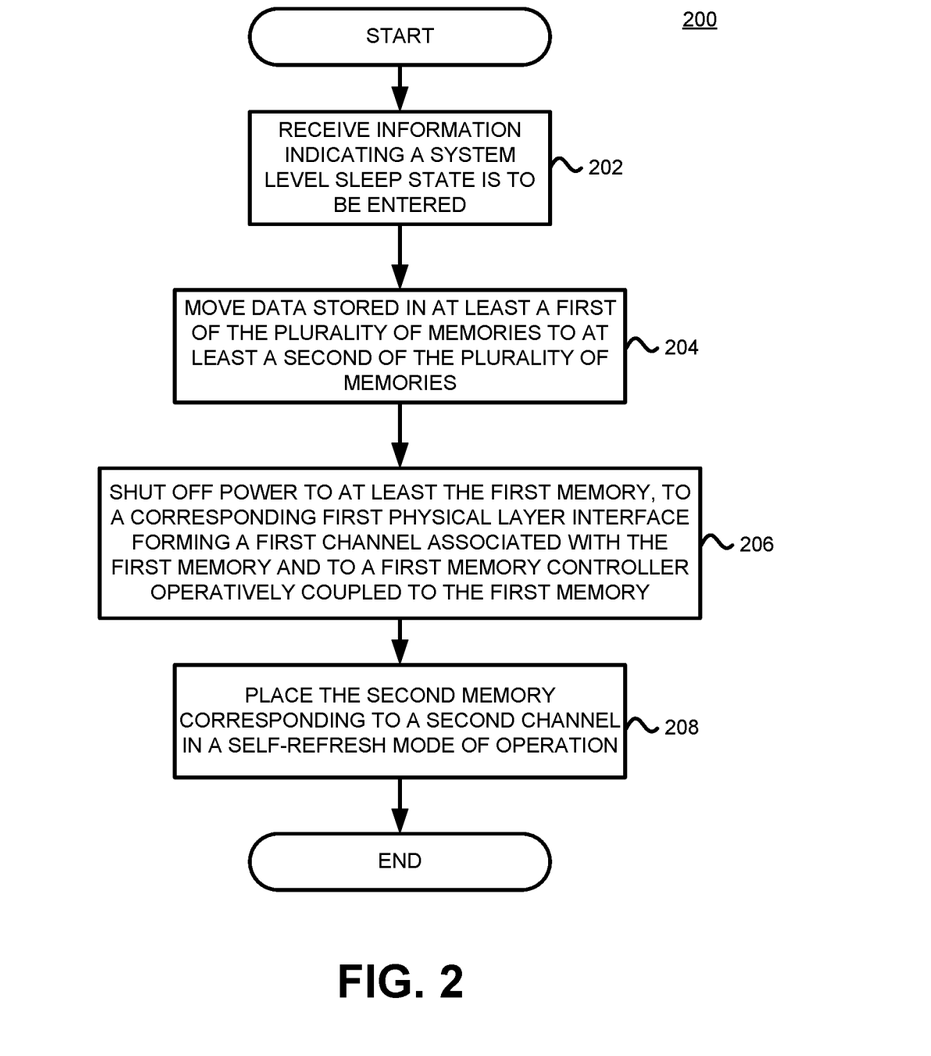
FIG. 2 is a flowchart illustrating a method for providing system level sleep state power savings and illustrates entry operations of a sleep power state in accordance with one example set forth in the disclosure.

Referring also to FIG. 2, a method 200 for providing system level sleep state power savings is shown and may be performed, for example, by the processor 128 and in particular, the system level sleep state memory channel power shutoff controller 180, however any suitable structure may be employed. In certain embodiments, the method includes receiving information indicating a system level sleep state is to be entered as shown in block 202. For example, the operating system executing on processor 128 detects that a system level sleep state is to be entered and sets a register or otherwise informs the system level sleep state memory channel power shutoff controller 180 of the system level sleep state condition. As such, the information may be a software call, register bits, or any other data indicating a system level sleep state is to be entered. As shown in block 204, the method includes moving data that is stored in at least a first of the plurality of memories 114 and 116 to at least a second of the plurality of memories such as memory 110 and/or memory 112. For purposes of illustration and not limitation, the operation will be described wherein four channels are provided by the system 100 each through a physical layer memory channel interface 118-124 to four sets of memories 110-116. As noted above, the memories 110-116 can include, for example, 3D stacked memories such as high bandwidth memories or any other suitable memories as desired. Accordingly, in normal operation, four channels are used by the system through two memory controllers 130 and 132. In response to a system level sleep state being entered, in this example data is moved from channel 3 and channel 4 from memories 114 and 116 respectively to channels 1 and 2 for storage in memories 110 and 112 respectively. In one example, moving of the data includes running software (e.g. a driver) that will result in data movement using the data transport network from memories 114 and 116 to one or more of memories 110 and 112 through channels 1 and/or 2. This is done, for example, by the system level sleep state memory channel power shutoff controller 180 sending requisite control information 186 to cause the moving (e.g., copying) of data.

As shown in block 206, the method includes shutting off power to the first memory, such as memory 114 and/or memory 116, and to corresponding physical layer memory channel interface 122 and 124. In one implementation this is done under the control of system level power management logic 144. All system level voltage rails/power domains are controlled by PML 144. In this example, the system level sleep state memory channel power shutoff controller 180 sends power control information 188 to the power management logic 144 to cause the physical layer memory channel interfaces 122 and 124 to have their voltages shutoff via control of switch 151. In this example, the physical layer interface power control logic 148 sends power control information 149 to shutoff the power supply 156 to the physical layer memory channel interfaces 122 and 124 by opening up the switch 151. In this example, the power control information 188 also informs the physical layer interface power control logic 148 to cause the switches 163 and 165 to shutoff power to memories 114 and 116. For example, the physical layer interface power control logic 148 sends power down commands to the switches 163 and 165 after the physical layer memory channel interfaces 122 and 124 have been shut down, or in any suitable order. Any other suitable approach may also be employed to shutoff power of the memories. As such, power is shutoff as part of a system level sleep state, to the memories and corresponding physical layer interfaces associated with the memories for channels 3-4. Stated another way, power to channel 3 through channel 4 are completely turned off. The data that was in memories 114-116 are moved to memory 110 and/or memory 112 prior to power being turned off.

As shown in block 208, the method includes placing the second memory, in this example, memory 110 and/or memory 112, corresponding to a second channel such as channel 1 and/or channel 2, in a self-refresh mode of operation and placing the physical layer memory channel interfaces 118 and 120 in a low power state. The memory controllers 130 and 132 in one example are also powered off via their respective power controllers 170 and 172 along with power off to the processors 126 and 128 and other components of the system as desired. In some examples, the memories 110 and 112 and physical layer memory channel interfaces 118 and 120 have a power rail that is always on, but the memories are placed in self-refresh operation during the system sleep state.

Accordingly, unlike prior systems that kept all the DRAMs in a self-refresh state and their corresponding physical layer interfaces in low power state (e.g., all channels in low power state), the system 100 moves data from channels 3-4 (their data stored in respective memories) to one or more of channel 1 and/or channel 2 (their respective DRAMs) and shuts off power to memories 114, 116 and physical layer memory channel interfaces 122 and 124. In some examples, when high bandwidth memory channels are employed, power savings can range from 17.5 milliwatts to 140 milliwatts per channel depending upon the technology and the DRAM features. This power savings can be significant for high bandwidth memory and as the number of channels increase in a system, the power savings also increases. Other advantages will be recognized by those of ordinary skill in the art.

The system 100 may be any suitable system including, but not limited to, a system on-chip (SoC), laptop device, wearable, smart phone, game console, server machine, desktop device, or any other suitable device. The processors 126 and 128 may be implemented in any suitable fashion and may include one or more processing cores, APUs, or any other configuration. The various components are interconnected through suitable communication paths that may include buses, configuration registers and any other suitable mechanisms. In one example, the system level sleep state memory channel power shutoff controller 180 sets configuration registers associated with the power management logic 144 to cause the power management logic to remove power, reduce power as needed for the memory controllers, physical layer interfaces and DRAMs. However, any suitable mechanism may be employed.

When the system 100 comes out of the system level sleep state and wants to enter a working state or normal state, the method includes receiving an indication to enter a system level working state. For example, the system level sleep state memory channel power shutoff controller 180 which when implemented as a driver executing on the processor, receives notification from the operating system that the system 100 has been changed to operate in a working state. In response to the system level working state indication, the method includes powering on the first memory such as memory 114 and/or memory 116 and their corresponding physical layer memory channel interfaces 122 and 124 and changing the memory 110 and/or 112 from a self-refresh mode to a normal operating mode. For example, the system level sleep state memory channel power shutoff controller 180 serves as a power on controller and sets the appropriate registers of the power management logic and/or sends appropriate power control information 188 to cause the physical layer interface power control logic to provide normal power to the physical layer memory channel interfaces 122 and 124 as well as inform the memory controller configuration logic 146 to have the memory controller 132 provide the requisite power control information to the DRAMs to apply power to memories 114 and 116. Any other suitable mechanism may be employed to power on the memory corresponding physical layer devices so that the channels 3-n are in normal operating mode.

Figure 3:
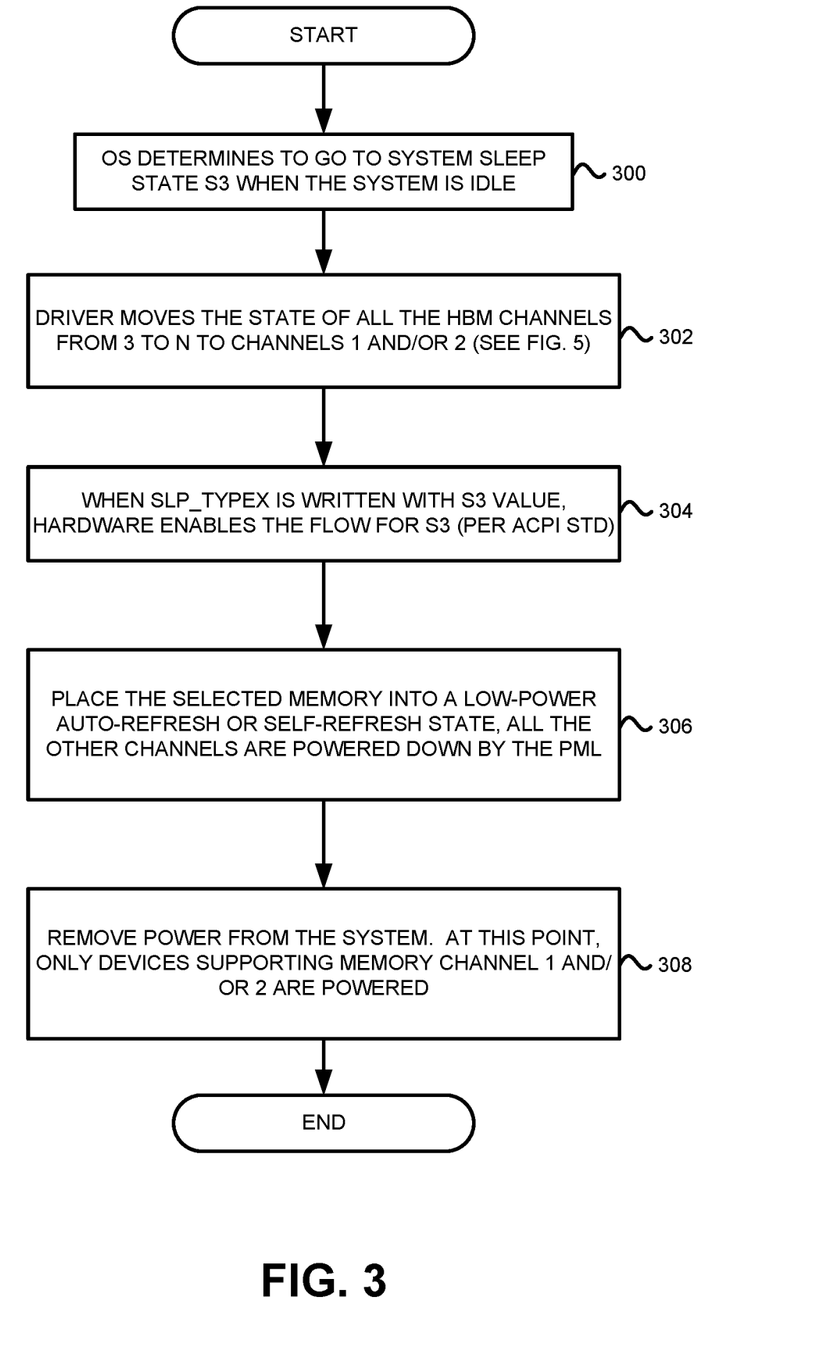
FIG. 3 is a flowchart illustrating a method for providing system level sleep state power savings and illustrates entry operations of a sleep power state in accordance with one example set forth in the disclosure.

FIG. 3 illustrates one example of a method for providing system level sleep state power savings in a system that employs a plurality of memory channels and corresponding plurality of memories coupled to respective memory channels. In one example, as shown in block 300, the operating system determines to go into a system sleep state, such as sleep state S3, when the system 100 is idle. As shown in block 302, the driver and in this example, the system level sleep state memory channel power shutoff controller 180 moves the data from the DRAMs and in this example, the state of all of the high bandwidth memory channels from channels 3-n to channel 1 and/or channel 2. In this example, channels 1 and 2 are set as default, to be left in lower power mode, but any suitable channel scan be selected as desired.

As shown in block 304, when a SLP_typex is written with the S3 value, such as a power management logic register, the power management logic 144 carries out the operations to enact the S3 sleep state power saving level per the ACPI standard. As shown in block 306, the system level sleep state memory channel power shutoff controller 180 causes the power management logic 144 to place the selected memories, in this example memories 110 and/or 112, into low power auto refresh or self-refresh state while shutting off power to memory channels 3-n which means shutting off power to the physical layer memory channel interfaces 122-124 and to memories 114-116. As such, instead of keeping all the memory channels in self-refresh operation, only channels 1 and/or 2 are kept in self-refresh operation and all other channels are powered down by the system level sleep state memory channel power shutoff controller 180 using the power management logic 144. This is done using the power supply separation such that individual power supply control is provided to allow shutting off of power to channels 3-n and allowing a low power state to be provided to the physical layer memory channel interfaces 118 and 120 and/or memories 110 and 112. As shown in block 308, the method includes removing other power from the system 100. For example, the power from the processors 126 and 128 may be shut off as well as to the memory controllers 130, 132, data transport network 134 and any other suitable systems or subsystems. As such, at this point, only the devices supporting the memory channels 1 and/or 2 are powered but in a low power state.

Figure 4:
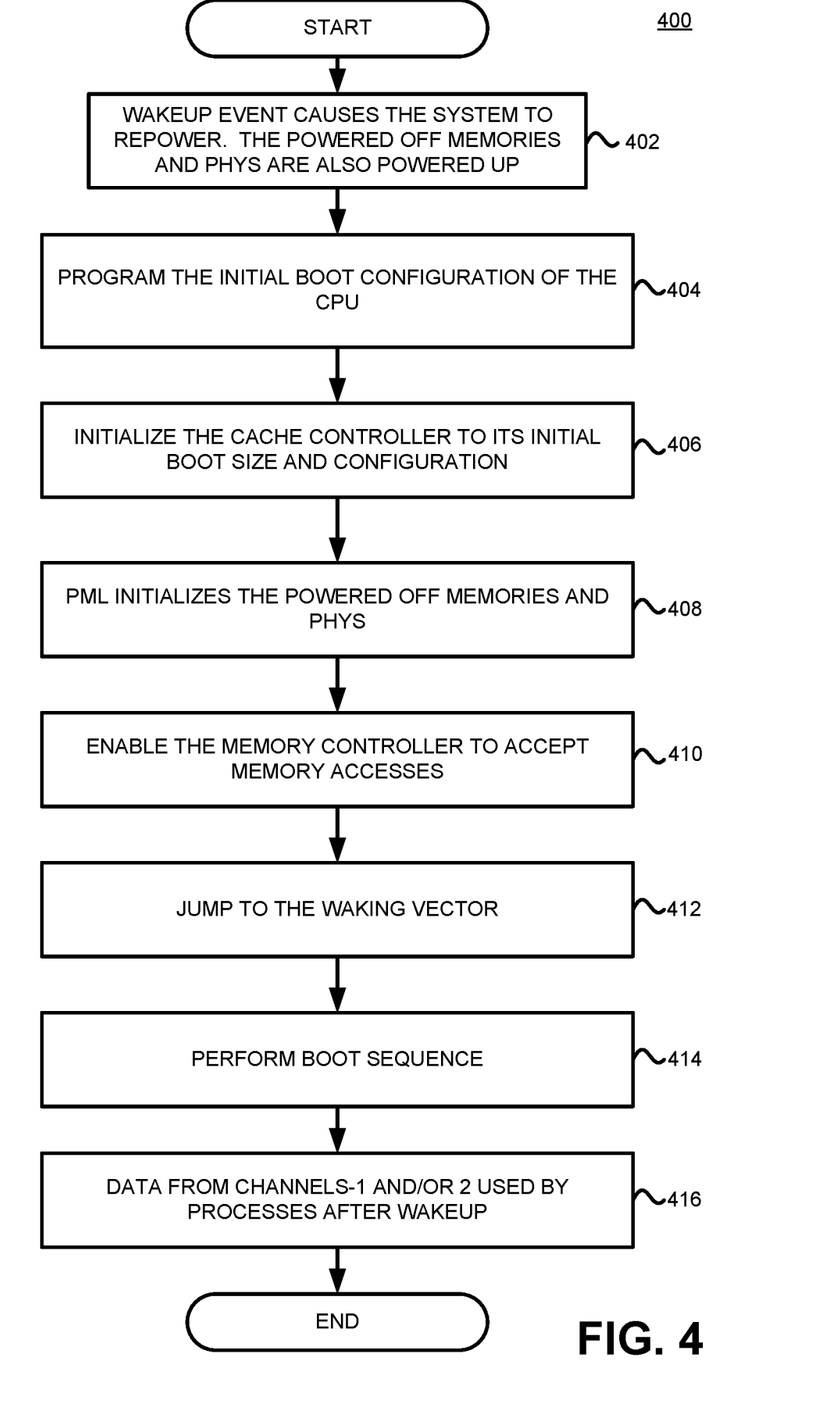
FIG. 4 is a flowchart illustrating a method for providing system level sleep state power savings and illustrates exit operations of a sleep power state in accordance with one example set forth in the disclosure.

Referring to FIG. 4, a method 400 for providing system level sleep state power savings is illustrated for when the system is woken up from a system sleep state. As shown in block 402, in one example, the operating system detects a wakeup event that causes the system 100 to wake and the powered off memories 114 and 112 and physical layer memory channel interfaces 112 and 124 are also powered up. In one example, the power management logic 144 causes the powering up of the memories 114 and 116 and physical layer memory channel interfaces 122 and 124 that were previously powered off during the system level sleep state. Other components are also put in their normal operating mode. For example, the memories 110 and 112 are taken out of self-refresh mode and memory controllers are put in normal operating mode. As shown in block 404, the method includes the operating system programming an initial boot configuration of the processor 128, such as the model specific (MSR) and memory type range (MTRR) registers. As shown in block 406, the method includes initializing a cache controller to an initial boot size and configuration. As shown in block 408, the method includes the power management logic 144 initializing the memories 114, 116 and physical layer memory channel interfaces 122 and 124 that were powered off. As shown in block 410, the method includes enabling the memory controller to accept memory accesses from the data transport network. As shown in block 412, the method includes jumping to the waking vector. As shown in block 414, the method includes performing a boot sequence and as shown in block 416, the method includes using the data that was moved to the channels 1 and/or 2 by processes in the processor 128 and/or 126.

Figure 5:
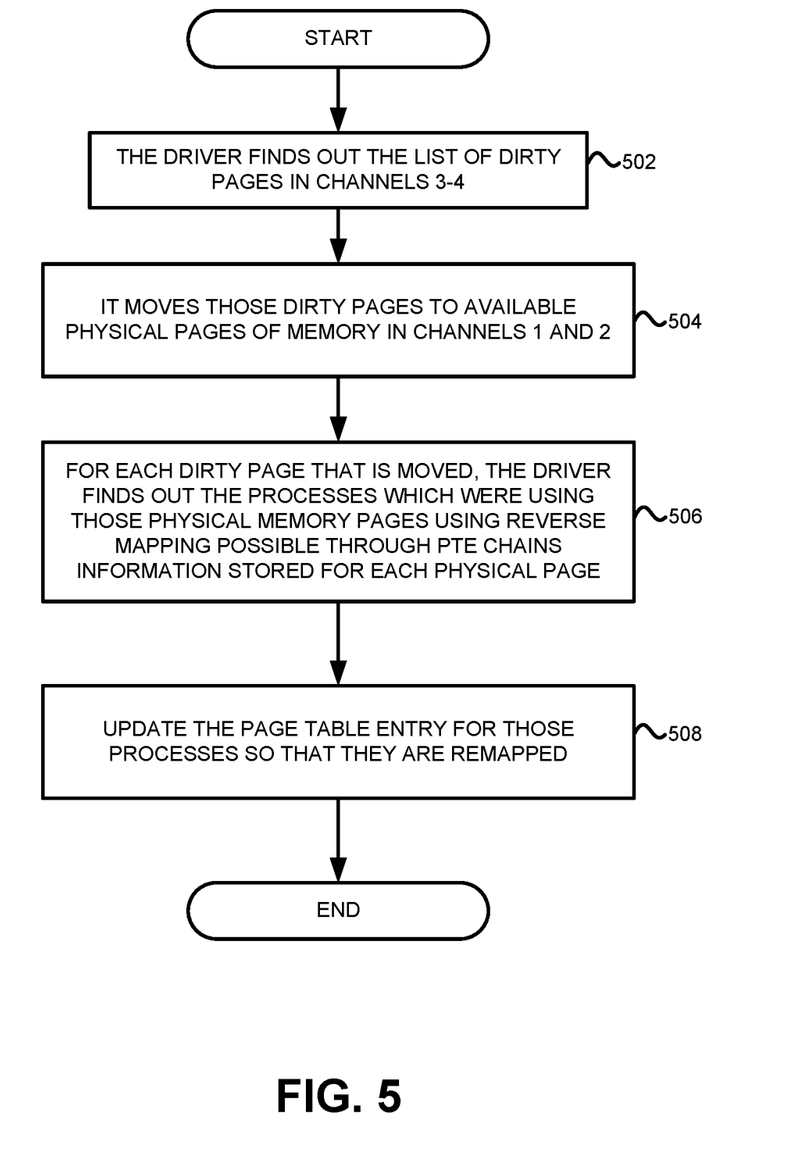
FIG. 5 is a flowchart illustrating a method for providing system level sleep state power savings and illustrates moving data in accordance with one example set forth in the disclosure.

As shown in FIG. 5, moving data stored in at least a first plurality of memories to at least a second of the plurality of memories includes determining a plurality of dirty pages in the first memory associated with the first channel as shown in block 502. By way of example, the system level sleep state memory channel power shutoff controller 180 finds out the list of dirty pages in channels 3-n. Dirty pages in physical memory have been updated by a process but not written to disk or permanent memory. Context data or process state data is stored in a page format. In one example, each channel handles 1 gigabit per second and the memories are partitioned in 4k size pages and each page is allocated to a process being carried out by the system, such as an application being executed by one or more processors. However, any suitable channel speed and page size may be employed. For each process, a virtual page table is used to map to physical page locations.

As shown in block 504, the method includes moving the determined dirty pages to available physical pages of memory in the second memory (i.e., memory 110) associated with the second channel (i.e., channel 1). In one example, the system level sleep state memory channel power shutoff controller 180 sends control information 186 to the data transport network 134 to move the dirty pages to available physical pages of memory in channels 1 and/or 2. As shown in block 506, the method includes remapping page table entries associated with the new dirty pages for the one or more processes that were using the dirty pages, prior to movement of the page tables. Stated another way, for each dirty page that is moved, the system level sleep state memory channel power shutoff controller 180 (e.g., driver executing on the processor 128) determines the processes that were using the physical memory pages that were moved, using reverse mapping operations through physical table entry chain information stored for each physical page. However, any suitable technique may be employed. As shown in block 508, the method includes updating the page table entries for those processes so that the page tables are remapped reflecting the movement of the page tables to channels 1 and/or 2 from channels 3-*n*.

As described above, a system for providing system level sleep state power savings receives information indicating a system level sleep state is to be entered and in response to receiving the system level sleep indication, moves data stored in at least a first of the plurality of memories to at least a second of the plurality of memories, in response to moving the data to the second memory causing power management logic to shut off power to: at least the first memory, to a corresponding first physical layer device operatively coupled to the first memory and to a first memory controller operatively coupled to the first memory, and place the second memory in a self-refresh mode of operation.

In some implementations, the system of one or more processors (e.g., a driver executing on the process) receives an indication to enter a system level working state and in response to the system level working state indication, causes the power management logic to power on the first memory, the corresponding first physical layer device and the first memory controller, and change the second memory from a self-refresh mode to a normal operating mode.

In certain implementations, one or more processors move data stored in at least the first of the plurality of memories to at least a second of the plurality of memories by at least determining a plurality of dirty pages in the first memory associated with the first channel, moving the determined dirty pages to available physical pages of memory in the second memory associated with the second channel, and remapping page table entries associated with the moved dirty pages for one or more processes that were using the dirty pages prior to movement of the page tables.

In some implementations, one or processors use the moved data stored in the second of the plurality of memories to restart processes when the system is waking up out of the system level sleep state.

In certain implementations, a data transport network under control of a controller, moves the data stored in at least the first of the plurality of memories to at least the second of the plurality of memories by copying data from the first memory to the second memory, and memory controller configuration logic configures the first memory controller to shut off power at least to the first memory and to the first physical layer device.

In some implementations, the one or more processors includes at least one central processing core and another of the processors includes at least one graphics processing core, and wherein the first and second memories are used as main memory of the system and wherein the system further includes a display that displays data from at least one of the first and second memories during normal operation. In certain implementations, the processor executes a stored operating system from system memory that provides the information indicating a system level sleep state is to be entered.

In some implementations, a non-transitory storage medium stores executable instructions that when executed by one or more processors causes the one or more processors to receive information indicating a system level sleep state is to be entered. In response to receiving the system level sleep indication, move data stored in at least a first of the plurality of memories to at least a second of the plurality of memories. In response to moving the data to the second memory, causing power management logic to shut off power at least: to the first memory, to a corresponding first physical layer device operatively coupled to the first memory and to a first memory controller operatively coupled to the first memory, and place the second memory in a self-refresh mode of operation.

In certain implementations, the non-transitory storage medium stores executable instructions that when executed by one or more processors causes the one or more processors to receive an indication to enter a system level working state, in response to the system level working state indication, cause the power management logic to power on the first memory, the corresponding first physical layer device and the first memory controller, and change the second memory from a self-refresh mode to a normal operating mode.

In some implementations, the non-transitory storage medium stores executable instructions that when executed by one or more processors causes the one or more processors to move data stored in at least the first of the plurality of memories to at least a second of the plurality of memories by at least determining a plurality of dirty pages in the first memory associated with the first channel, moving the determined dirty pages to available physical pages of memory in the second memory associated with the second channel, and remapping page table entries associated with the moved dirty pages for one or more processes that were using the dirty pages prior to movement of the page tables.

In certain implementations, the non-transitory storage medium stores executable instructions that when executed by one or more processors causes the one or more processors to use the moved data stored in the second of the plurality of memories to restart processes when waking up out of the system level sleep state.

In some implementations, the non-transitory storage medium stores executable instructions that when executed by one or more processors causes the one or more processors to cause a data transport network to copy data from the first memory to the second memory and configuring a first memory controller to cause power to be shut off to the first memory and to the first physical layer interface.

In certain embodiments as described above, during a system level sleep state mode, data such as system state information is moved from current memories to a fewer number of memories to reduce the number of memories and physical layer memory channel interfaces that are in low power mode and in self-refresh mode. In these implementations, the power is turned off for all the other physical layer memory channel interfaces and corresponding memories that have their state information moved to other memories. Power savings is improved by shutting power off to memory channels in a system level sleep mode instead of having all memories operate in a self-refresh mode.

The above detailed description and the examples described therein have been presented for the purposes of illustration and description only and not for limitation. For example, the operations described are done in any suitable manner. It is therefore contemplated that the present implementations cover any and all modifications, variations or equivalents that fall within the scope of the basic underlying principles disclosed above and claimed herein. Furthermore, while the above description describes hardware in the form of a processor executing code, hardware in the form of a state machine or dedicated logic capable of producing the same effect, other structures are also contemplated.

What is claimed is:

1. Power management logic comprising:
logic operative to, in response to receiving information indicating a system level sleep state is to be entered by a system:
   shut off power at least: to a first memory coupled to a corresponding first physical layer interface forming a first memory channel associated with the first memory, to all of the corresponding first physical layer interface operatively coupled to the first memory and to a first memory controller operatively coupled to the first memory, such that a power supply voltage to circuits of the first physical layer interface forming the first memory channel is shut off; and
   place a second memory, coupled to a corresponding second memory channel physical layer interface, the second memory channel physical layer interface forming a second memory channel associated with the second memory, in a self-refresh mode of operation after data is moved from the first memory to the second memory.

2. The power management logic of claim 1 wherein the logic is operative to send power control information to shutoff power to the first physical layer interface, to the first memory controller and to cause a shutoff of power to the first memory.

3. The power management logic of claim 2 wherein the power control information comprises control information that controls a switch and wherein shutting off power to all of the first physical layer interface comprises controlling the switch to remove a power voltage from the first physical layer interface.

4. A system comprising:
instruction memory comprising executable instructions; and
one or more processors operative to execute the executable instructions, that cause the one or more processors to:
   receive information indicating a system level sleep state is to be entered by the system;
   in response to receiving the information indicating the system level sleep state, move data stored in at least a first memory coupled to a corresponding first physical layer interface forming a first memory channel associated with the first memory to at least a second memory coupled to a corresponding second memory channel physical layer interface, the second memory channel physical layer interface forming a second memory channel associated with the second memory;
   in response to moving the data to the second memory, causing power management logic to:
      shut off power at least: to the first memory, to all of the corresponding first physical layer interface operatively coupled to the first memory and to a first memory controller operatively coupled to the first memory, such that a power supply voltage to circuits of the first physical layer interface forming the first memory channel is shut off; and
      place the second memory in a self-refresh mode of operation.

5. The system of claim 4 comprising the power management logic and comprising a switch controllable by the power management logic and wherein shutting off power to all of the first physical layer interface comprises controlling the switch to remove a power voltage from the first physical layer interface, and wherein the one or more processors is operative to:
   receive an indication to enter a system level working state;
   in response to the system level working state indication, cause the power management logic to power on the first memory, the corresponding first physical layer interface and the first memory controller; and
   change the second memory from a self-refresh mode to a normal operating mode.

6. The system of claim 4 wherein the one or more processors are operative to move data stored in at least the first memory to at least the second memory coupled to a corresponding second physical layer interface forming a second channel associated with the second memory by at least:
   determining a plurality of dirty pages in the first memory associated with the first channel;
   moving the determined plurality of dirty pages to available physical pages of memory in the second memory associated with the second channel; and
   remapping page table entries associated with the moved dirty pages for one or more processes that were using the dirty pages prior to movement of the dirty pages.

7. The system of claim 4 wherein the one or more processors are operative to use moved data stored in the second memory to restart processes when waking up out of the system level sleep state.

8. The system of claim 4 comprising:
a data transport network, operatively coupled to the one or more processors, operative to move the data stored in at least the first memory to at least the second memory by copying data from the first memory to the second memory as controlled by the one or more processors; and
memory controller configuration logic operatively coupled to the one or more processors and to the first memory controller, operative to configure the first memory controller to shut off power at least to the first memory and to the first physical layer interface.

9. The system of claim 4 wherein the one or more processors comprises at least one central processing core and another of the processors comprises at least one graphics processing core, and wherein the first and second memories comprise stacked memories and are used as main memory of the system and wherein the system further comprises a display operatively coupled to display data from at least one of the first and second memories during normal operation.

10. The system of claim 4 wherein the system is comprised of a system on chip (SoC).

11. The system of claim 4 wherein the one or more processors is operative to execute a stored operating system from system memory that provides the information indicating a system level sleep state is to be entered.

12. A method for providing system level sleep state power savings in a system, the method comprising:
based on information indicating a system level sleep state is to be entered by the system, shutting off power at least: to a first memory coupled to a corresponding first physical layer interface forming a first memory channel associated with the first memory, shutting off power to all of the corresponding first physical layer interface operatively coupled to the first memory and to a first memory controller operatively coupled to the first memory, such that a power supply voltage to circuits of the first physical layer interface forming the first memory channel is shut off; and placing a second memory, coupled to a corresponding second memory channel physical layer interface, the second memory channel physical layer interface forming a second memory channel associated with the second memory, in a self-refresh mode of operation after data is moved from the first memory to the second memory.

13. The method of claim 12 further comprising sending power control information to shutoff power to all of the first physical layer interface, to the first memory controller and to cause a shutoff of power to the first memory.

14. The method of claim 13 wherein the power control information comprises control information that controls a switch and wherein shutting off power to all of the first physical layer interface comprises controlling the switch to remove a power voltage from the first physical layer interface.

15. The method of claim 12 further comprising:
in response to receiving the system level sleep indication, moving data stored in at least the first memory to at least a second memory; and wherein
shutting off power at least to the first memory, to all of the corresponding first physical layer interface and to the first memory controller is performed in response to moving the data to the second memory.

16. The method of claim 15 further comprising:
receiving an indication to enter a system level working state;
in response to the system level working state indication, powering on the first memory, the corresponding first physical layer interface and the first memory controller; and
changing the second memory from a self-refresh mode to a normal operating mode.

17. The method of claim 15 further comprising:
determining a plurality of dirty pages in the first memory associated with a first channel;
moving the determined plurality of dirty pages to available physical pages of memory in the second memory associated with a second channel; and
remapping page table entries associated with the moved dirty pages for one or more processes that were using the dirty pages prior to movement of the dirty pages.

18. The method of claim 12 further comprising using the moved data stored in the second memory to restart processes when waking up out of the system level sleep state.

19. The method of claim 12 further comprising executing a stored operating system from system memory that provides information indicating a system level sleep state is to be entered.

20. The method of claim 15 wherein moving data comprises copying data from the first memory to the second memory using one or more processors; and wherein the method further comprises using memory controller configuration logic operatively coupled to the one or more processors and to the first memory controller, to configure the first memory controller to shut off power at least to the first memory and to the first physical layer interface.

* * * * *